United States Patent
Futatsugi (10) Patent No.: US 6,253,689 B1
(45) Date of Patent: Jul. 3, 2001

(54) INCINERATOR

(76) Inventor: Takehiko Futatsugi, 11-12, Isobe 4-chome, Annaka-shi, Gunma, 379-0127 (JP)

( * ) Notice: Subject to any disclaimer, the term of this patent is extended or adjusted under 35 U.S.C. 154(b) by 0 days.

(21) Appl. No.: 09/117,924

(22) PCT Filed: Sep. 5, 1997

(86) PCT No.: PCT/JP97/03114

§ 371 Date: Aug. 10, 1998

§ 102(e) Date: Aug. 10, 1998

(87) PCT Pub. No.: WO98/10223

PCT Pub. Date: Mar. 12, 1998

(30) Foreign Application Priority Data

Sep. 7, 1996 (JP) ................................................ 8-272837
Sep. 9, 1996 (JP) ................................................ 8-273910
Oct. 7, 1996 (JP) ................................................ 8-300780
Oct. 9, 1996 (JP) ................................................ 8-303444

(51) Int. Cl.[7] .................................................... F27B 7/00
(52) U.S. Cl. .................. 110/246; 110/203; 110/215; 110/258; 110/259; 432/111; 432/117
(58) Field of Search .................................. 110/205, 210, 110/211, 212, 214, 215, 216, 224, 226, 227, 233, 234, 235, 240, 241, 246, 255, 258, 259, 345, 346, 254, 302, 322; 126/77, 149, 181, 512; 432/107, 105, 108, 111, 116, 117, 118

(56) References Cited

U.S. PATENT DOCUMENTS

| | | | | |
|---|---|---|---|---|
| 1,987,242 | * | 1/1935 | Madsen | 432/111 X |
| 2,912,941 | * | 11/1959 | Hughes et al. | 110/254 |
| 3,021,127 | * | 2/1962 | Reaney et al. | 432/116 |
| 3,604,692 | * | 9/1971 | Smithwick | 432/111 |
| 4,038,032 | * | 7/1977 | Brewer et al. | 110/212 X |
| 4,060,042 | * | 11/1977 | Baraldi et al. | 432/110 X |
| 4,285,773 | * | 8/1981 | Taciuk | 432/108 X |
| 4,393,815 | * | 7/1983 | Pedersen et al. | 110/215 X |
| 4,426,937 | * | 1/1984 | Sietmann et al. | 110/322 X |
| 4,438,756 | * | 3/1984 | Chamberlain et al. | 110/254 X |
| 4,470,358 | * | 9/1984 | Prochnow | 110/254 X |
| 4,478,158 | * | 10/1984 | Smith | 110/215 |
| 5,014,680 | * | 5/1991 | Siemer | 126/77 |
| 5,158,025 | * | 10/1992 | Johnson | 110/235 |
| 5,227,026 | * | 7/1993 | Hogan | 432/116 X |
| 5,366,596 | * | 11/1994 | Taciuk et al. | 432/116 X |
| 5,393,225 | * | 2/1995 | Freiberger et al. | 432/107 X |
| 5,523,060 | * | 6/1996 | Hogan | 432/111 X |
| 5,562,053 | * | 10/1996 | Lim | 432/107 X |
| 5,658,094 | * | 8/1997 | Clawson | 432/111 |
| 5,678,494 | * | 10/1997 | Ulrich | 110/302 X |

FOREIGN PATENT DOCUMENTS

| | | | | |
|---|---|---|---|---|
| 246812 | * | 5/1912 | (DE) | 432/111 |
| 388283 | * | 1/1924 | (DE) | 432/111 |
| 417825 | * | 8/1925 | (DE) | 432/111 |
| 1 902 812 | * | 9/1969 | (DE) | 432/108 |
| 2 140 637 | * | 3/1973 | (DE) | 432/111 |
| 2 690 983 | * | 11/1993 | (FR) | 432/118 |
| 12664 | * | 6/1899 | (GB) | 432/116 |

* cited by examiner

Primary Examiner—Ira S. Lazarus
Assistant Examiner—Ljiljana V. Ciric
(74) Attorney, Agent, or Firm—Gottlieb, Rackman & Reisman P.C.

(57) ABSTRACT

A waste incinerator which includes a housing formed by a heat insulating outer wall, air ducts; a decomposing chamber; a fire room; and a catalytic converter, all disposed in the housing. Waste is introduced into the fire room and incinerated there, and the remains are retrieved from the fire room in such a manner that the incoming materials such as air and waste on one hand the combustion gases and residue on the other hand form a counter flow heat exchange. Various embodiments are disclosed in which the fire wall is or not rotary.

2 Claims, 9 Drawing Sheets

INCINERATOR

TECHNICAL FIELD

The invention is an improvement in a garbage/wastes/dust/trash incinerator (hereinafter called "machine". The invented incinerator is a machine comprising a drying chamber (drier), a decomposing chamber (decomposer), a combusting chamber (fire room), a catalytic converter (converter) and a water vapor condenser (condenser). They are integrated such that a counter flow heat exchange is effected between the output and the input, wherein a basic substance is mixed with the waste. The term output refers to exhaust gas (exhaust) and the ashes (ash). The term input refers to combustion air (air) and waste. The machine needs a very small amount of auxiliary fuel. The emission of pollutants can be reduced to a very low level. The machine is capable of dealing with various types of waste. Most of the constituent elements of the machine may be incorporated in a rotating body. The temperature of exhaust is close to the room temperature. A scrubber can be directly connected to or integrated with the machine.

BACKGROUND ART

Waste incineration is indispensable to industry for reducing the weight of waste and eliminating the danger of fire, pathogenic organs, and toxic organic compounds. In addition to harmful or toxic compounds (pollutants), which exist in waste and remain after combustion, such as arsenic, heavy metals and radioactive substances, pollutants are also produced by incineration even if waste has no pollutants. Pollutants produced in incineration are causing problem today. Rotating reactor is adopted and/or lime is added in incineration, however, effective results cannot be obtained.

Burning waste needs oxygen ($O_2$). Only ⅕ of the air being $O_2$, burning one metric ton dried waste needs fifteen ton (11,000 $m^3$) air. Major thermal substances of the incineration are water ($H_2O$) air and exhaust. Exhaust has usually high temperature such as 600–1500 degrees C. Heat of vaporization of $H_2O$ (latent heat) and heat which is used for heating the exhaust (sensible heat) are wasted into the atmosphere. The latent heat is a large amount of energy. Therefore the total combustion heat (higher heat value) is distinguished from that omitted the latent heat of ($H_2O$) (lower heat value). Living organisms use higher heat value, but common burning uses only lower heat value. While ($H_2O$) is not only produced during burning, but is also found in waste, latent heat of $H_2O$ from both sources is wasted. Therefore, 2–5 times of weight of waste auxiliary fuel is consumed in raw garbage incineration. Incinerating waste including 80–90% $H_2O$ such as sewerage dregs cake, filter remained tofu scum (like a brewer's grains of tofu making) and wasted tofu bean-curd, even 10 times of weight auxiliary fuel can only produce carbides including raw part. In general in these cases, extraordinary amount of auxiliary fuel is consumed in waste incineration.

Heat recycle arts are described.

Let air and exhaust have the same heat capacity and flow in sufficiently long pipes, the exhaust being hot and air being cold at each intake. When the two pipes are contacted along their whole length with the intakes being adjacent and the outlets being adjacent, the exhaust and air at the outlets have the same average temperature. This arrangement is called a parallel flow heat exchange (PF). On the other hand, when the pipes are so contacted that each intake is adjacent to the other outlet, then the temperature at each outlet becomes the same as the temperature at the corresponding or adjacent intake. This arrangement is called a counter flow heat exchange (CF). CF method has been tried in the dilute fuel combustion.

When a higher temperature air is used, the lower concentration flammables can be ignited, and nitrogen oxides ($NO_x$), carbon monoxide (CO), soot, etc. can be reduced, and efficiency of energy transformation rate is improved. In some cases trials were conducted wherein fuel combustion and $H_2O$ vapor in exhaust was not condensed into liquid.

Waste incineration is much more difficult than proper fuel combustion, because waste includes a large amount of $H_2O$, many nonvolatiles, solids or various substances, ash remains or residuals. Burning waste produces pollutants easily and has various shapes. Therefore, it has been considered impossible in waste incineration to use high technologies, which are difficult to use even in fuel combustion.

Pollutants can be classified into two groups: inevitable and additional. Inevitable pollutants are pollutants which cannot be avoided and include carbon dioxide, $CO_2$ and nitrogen oxides $NO_x$. If the main flammable components of waste are generally organic compounds, waste incineration produces $CO_2$ and $H_2O$. $CO_2$ is not very harmful, but a person can die if he is exposed to it in high concentration. Since $CO_2$ is a global greenhouse effect substance, the reduction of its emission is required. Auxiliary fuel also produces $CO_2$. The reduction of auxiliary fuel is necessary for saving natural resources, too. $CO_2$ produced by auxiliary fuel should be reduced much more than $CO_2$ produced by waste itself. Incineration of waste formed of a mixture of plastics is, however, is a problem because it produces pollutants such as dioxins. Electric generation exploiting the heat from waste incineration is recommended, however, saving auxiliary fuel is more effective for present technology.

$NO_x$ is produced only when the air is heated and its formation enthalpy is positive so that it is decomposed by catalysts. A catalytic converter of a car utilizes this effect. $NO_x$ is hardly produced in incomplete combustion and is reduced when complete combustion gas (oxidizing flame) is mixed with incomplete combustion gas (reducing flame).

Additional pollutants are classified further into nonflammable and flammable pollutants. Nonflammable pollutants include halogen, hydrogen halides, $NO_x$, sulfur oxides ($SO_x$), phosphorus oxide ($PO_x$) and fly ash. Flammable pollutants include organic compounds, carbon, CO, ammonia ($NH_3$), hydrogen cyanide (HCN), hydrogen sulfide ($H_2S$) and sulfur. Organic compounds include organic halogen compounds, amines, nitrites, mercaptans, hydrocarbons, alcohol, aldehydes, organic acid and soot. During a complete combustion flammable pollutants changes into inevitable pollutants and/or nonflammable pollutants. However, flammable pollutants such as organic halogen compounds cannot be easily combusted completely. The pharmacopoeia of many countries and international organizations (USA, Japan, UK, France, European Pharmacopoeia, International Pharmacopoeia, etc.) mentions the "oxygen flask combustion method" to measure the quantity of and/or identify halogen (Br, Cl, F, I) or sulfur (S) included in organic compounds. The title of the mentioned pharmacopoeia of USA is "Oxygen Flask Combustion". This method comprises the following steps. The organic substance is set in a filter paper in a platinum (Pt) basket, it is burned in pure $O_2$ atmosphere and the quantity of acid gas such as hydrogen chloride (HCl) produced in combustion is measured. Even substance which are very difficult to burn, such as organic halogen compounds can be completely burned under certain favorable condition, such is pure $O_2$ and in the presence of a Pt catalyst.

If additional air is applied in order to achieve complete combustion, then additional auxiliary fuel is also required to provide the sensible heat. From an economical point of view, an incomplete but nearly complete combustion is preferable.

Dioxins are a kind of organic halogen compound, which is an organic compound combined with chlorine when waste is scorched, and is produced by the burning of organic halogen compounds such as vinyl chloride. Halogen elements and halogen compounds, which vaporize in an incinerator, are called volatile halogens. Organic halogen compounds decompose thermally above 180 degrees C. and result in volatile halogens such as HCl or $Cl_2$. Aluminum chloride $AlCl_3$ (b.p. 183 degrees C.) is also a volatile halogen. Volatile halogens change organic compounds into organic halogen compounds. Production of dioxins can be observed even in the incineration of waste, which includes no organic halogen compounds, when volatile halogens are produced. Carbon reacts with hydrogen to produce organic compounds at high temperatures.

Even if organic halogen compounds are decomposed thermally, decomposed materials reform into organic halogen compounds again. Volatile substances condense in the cooler neighborhood than the boiling point zone. Organic halogen compounds are volatile at the fire room temperature. Organic halogen compounds cannot be easily vaporized in waste clusters, blocks or wastes buried in ash, and remain or condense therein, because the raw parts of waste have low temperature. Thereafter, organic halogen compounds may be found in ash when raw parts of waste burn out and the ash cools off for lack of flammables. This is the mechanism, which results in dioxin being found in the burned out ash.

$NO_x$ are produced only in the presence of air. More $NO_x$ is produced during burning of waste which includes nitrogen element (N). The waste, which produces acid gas in complete combustion, includes specific elements (N, F, Cl, Br, I, S, P, etc.), which are called acid pollutant elements. Waste including N produces $NO_x$ in complete combustion and produces a flammable pollutant during incomplete combustion which may be referred to as an acid pollutant such as amine, ammonia, and hydrogen cyanide) in incomplete combustion. Acid pollutant is an acid gas, therefore it can be removed by alkaline aqueous solution in the scrubber. But it is impossible that have the scrubber connected to the machine directly or integrated with the machine because the high temperature exhaust makes the scrubber solution boil.

Combustion is a chemical reaction and raw materials react to produce reaction products (positive reaction). At the same time, the reaction products react to produce raw materials (negative reaction). Both reactions are accelerated at high temperature. Negative reaction can hardly happen if the reaction products are removed. Removal of the reaction products to restrain the negative reaction is referred to as disproportionation. While gases react very fast, liquids slower, solids very slow. For example, fuel gas burns explosively but charcoal and coke burn for a long time. If a part of the reaction products become solid (which do not vaporize, melt or decompose) then the negative reaction can hardly happen as well. This is also a type of disproportionation. While it is difficult to reduce the negative reaction to $1/10$ by reaction temperature variation, it is easy to make it less than 1/1,000 using disproportionation.

We now consider the materials (basic substances) that react with acid pollutant easily to yield harmless solid compounds (salts) which do not vaporize, melt or decompose even at high fire room temperatures. Basic substances render acid pollutants harmless. Metals, oxides, hydroxides, carbonates, hydrogen compounds, organic acid salts, alcoholates and organic metal compounds, which include alkali metals (K, Na, etc.) or alkaline earth metals (Ca, Mg, etc.), are examples of basic substances. The disproportionation of acid pollutants using basic substances is called neutralizing fixation. The total valence number of a base element per acid pollutant element in the reaction is called a stoichiometric ratio. The valence of alkali metals is one and the valence of the alkaline earth metals is two. The stoichiometric ratios of N, halogen, S and P are one, one, two and three, respectively. The stoichiometric ratio of 1 for N is only practical under 300 degrees C., because its salts decompose above that temperature. Halogen salts such as KCl and $CaCl_2$ melt under the combustion temperature so that the stoichiometric ratio of halogens is practically 1 only under that temperature. However halogen oxides make their melting points higher, the stoichiometric ratio of halogens can practically be 'two'.

DISCLOSURE OF INVENTION

The following guidelines are used for minimizing the pollutant emission (referred to herein as depollution).

(1).—Auxiliary fuel is used only to heat up the machine initially and to maintain the flame (Micro-fuel).

(2).—Heat energy for combustion and depollution must be obtained from the recycling of the latent heat and the sensible heat.

(3).—Waste must be incinerated utilizing disproportionation under the good condition like the oxygen flask combustion method of Pharmacopoeia.

(4).—Wasted heat must be reused/recycled as far as possible.

(5).—Inevitable pollutants must be reduced.

If micro-fuel condition is achieved by guideline (1), $CO_2$ emission is minimized. By guide line (2) waste is dried, a sufficient amount of air is heated for complete combustion, the temperature of the inlet of converter is maintained and exhaust temperature is maintained close to room temperature. Combination of guidelines (1) and (2) achieve guideline (3). Since wastes are combusted with a sufficient amount of high temperature air, flammable pollutants are not produced and guideline (3) is achieved. The scrubber can be directly connected because of room temperature exhaust. Therefore acid pollutants are removed.

Along with these guidelines, the heat exchange is described first.

The components of the input (i.e., air and waste including basic substances) and the output (i.e., the exhaust and ash including remained basic substances) include the same elements and have the same total mass. If the elements and mass are the same, then the heat capacity of the smaller molecules becomes larger. Therefore, the output has a higher heat capacity than the input. Thus using CF, air temperature can become close to the fire room wall temperature. Namely The output heat is sufficient for the air to be heated to the high temperature of fire room wall.

Waste can be made dry only by the heat of the output.

Therefore micro-fuel can be achieved, when the temperature of the fire room wall is high. The difference of the heat capacities between input and the output can be ignored, when the amount of air is more than two times that of stoichiometry (more than 10% $O_2$ in exhaust) or the fraction of $H_2O$ or the ash component is high. In fact, exhaust temperature is calculated as 90 degrees C. in the case of plastic waste, the fire room wall temperature as 1000 degrees C., the room temperature as 25 degrees C. and the remaining $O_2$ is 10%. In this case, the scrubber solution does not boil even if the scrubber is directly connected. Namely;

Exhaust temperature can be close to the room temperature.

The scrubber can be directly connected or integrated.

The fire room wall temperature becomes high enough using CF method under the following condition. The combustion temperature becomes higher when the amount of air is a little less than the stoichiometric amount. $O_2$ is insufficient for complete combustion under this condition. When the combustion temperature is high, then waste is decomposed effectively and the combustion goes well. Air must be shared so that air is nearly the stoichiometric in the center of fire room. Since heat is conducted from the fire room to the atmosphere by heat insulation, the heat insulation acts as a heat conductor. The coefficient of heat transfer is the thermal conductivity divided by the thickness of heat conductor (heat transfer length). The conductive product is the conduction section multiplied by coefficient of heat transfer. The product indicates the ability of the heat exchange. A machine must be designed so that conductive product is large enough in the heat exchanger, making conduction section large and the heat conductor thin. All parts in a machine (waste transporter, ember transporter, ash transporter, ceramics fixing plates, scrubber wall, connecting points or area of parts and the others) must be considered as heat-conducting elements such as heat conducting fins, heat radiating fins, heat accepting fins or heat reflecting fins. The conduction section should be as large as possible, paying an attention not to enlarge the gas flow resistance. For example, air pipes in exhaust enlarge conductive section. In the low temperature zone including condenser, the diameters must be large and many or large heat fins are arranged for the exchange of big heat of condensation. But the thermal conductivity of liquid $H_2O$, which is about twenty times of air, moderates the condition. The large surface of the high temperature zone (hot zone) cools fire room, since it enlarges conductive product. The fire room must be as small as possible and so must be hot zone around the same. Air ducts should surround all hot zone components, and the heat radiation must be reflected by heat reflectors at all windows except the intake of converter, which must be hot. The whole body must be wrapped with thick heat insulators.

The heat energy in the fire room (higher heat value added by the recycled heat) equals to the emission heat (emitted directly from the outer wall of fire room to the atmosphere) plus the transferred heat (heat of exhaust and ash). The transferred heat equals the recycled heat (recovered as the heat of air and waste to fire room) plus the unrecycled heat (not recovered to fire room). The unrecycled heat includes the heat, which is harvested by the heat utilizing apparatus (utilizer). Since both heat capacities of incoming and outgoing are almost equal, the unrecycled heat becomes almost the same as heat harvested by utilizer. The harvested heat must not be so large as to reduce the combustion temperature. Therefore, the emission heat equals higher heat value minus the unrecycled heat. The fire room wall temperature is the emission heat divided by conductive product plus external wall temperature. The combustion temperature becomes 100–500 degrees C. higher than that of fire room wall (inside). When higher heat value is larger than the unrecycled heat, the reduction of conductive product can make the fire room wall temperature high. This higher heat value is larger than the lower heat value of dried waste. Namely;

Even wet waste can burn almost the same temperature as dry one.

A machine has rotating parts and surface areas that can be at 50–80 degrees C. Protective walls which have interiors acting as external air ducts, cover these dangerous areas. Sucking external air by air inlet fans, leaked gas and heat can be returned to the machine.

The accumulation of such small devices follows a big effect. Thereby the heat exchange rate and the fire room wall temperature can be high.

There is waste that is difficult to ignite even if dried, because its higher heat value is almost zero, or includes too much $H_2O$ to get the necessary conductive product value. Therefore, a little more auxiliary fuel is needed in these cases.

Most of the purpose of incineration of waste is the reduction of weight of the waste. This indicates that the amount of ash or the heat capacity of ash can be ignored. Namely, in the most case of waste, ash is ignored in heat exchange calculation. Once depollution and micro-fuel are achieved, a machine is recommended to be designed so that manufacturing cost is low and the handling convenience have priority over a small variation of the rate of the wasted heat utilization.

Base and neutralizing fixation are described, next.

The most suitable basic substances are oxides, hydroxides, and carbonates. Alkaline earth metals are suitable for the invention because the porosity ceramics within the converter is less damaged by them. Calcium compounds calcium compounds i.e. quick lime (calcium oxide CaO), slaked lime (calcium hydroxide $Ca(OH)_2$ and limestone powder (calcium carbonate $CaCO_3$) are the most economical. In fire room, $Ca(OH)_2$ produces $H_2O$ and $CaCO_3$ produces $CO_2$. Both CaO and $Ca(OH)_2$ are produced baking $CaCO_3$ and emitting $CO_2$. $CaCO_3$ has advantage in $CO_2$ produced by baking fuel from the global point of view. CaO has a problem of safety. CaO and $CaCO_3$ are difficult to obtain in as a fine powder. $Ca(OH)_3$ has advantageous from these points.

Each acid pollutant element shows certain characteristics during neutralizing fixation. Above 180 degrees C., organic halogen compounds decompose thermally and give off volatile halogen, which react with a basic substance. Since the halogen salts melt at high temperature, neutralizing fixation is effective under 700 degrees C. Therefore, the stages of the fixation are before fire room and in exhaust (in the converter, condenser and the scrubber). In the fire room, the organic matter bums and is reduced. If there is only little organic matter, then volatile chlorine can hardly react with it to produce organic chlorides in the reverse or negative reaction.

Concerning S, since decomposed matters such as sulfur or hydrogen sulfide do react not easily with basic substances, S must be changed into $SO_x$, which is produced when they are burned, for neutralizing fixation. The fixation occurs in the fire room and in the exhaust.

The neutralizing fixation of N is only effective in the exhaust under 300 degrees C. $NO_x$ is an oxidizing agent and helps to eliminate flammables. After maintaining $NO_x$ in moderate concentration using the oxidizing flame and reducing flame mixture, and the catalytic effect in the fire room, $NO_x$ is removed in the converter, condenser and the scrubber.

The catalyst is described next.

Exhaust from fire room is passed through the secondary combusting chamber namely the converter, where ceramics, which include oxides or oxoacid salts or double oxides of silicon and/or aluminum and/or zirconium as main components, are disposed. These ceramics act catalyst like Pt over 600 degrees C. The catalyst adsorbs gas molecules such as $O_2$, $SO_x$, $Cl_2$ on its surface and compress them to high pressure. Therefore even matter, which is difficult to burn or which is too dilute to burn in the air, can burn well. The more surface the ceramics have, the more effective they are. Therefore porous ceramics, which have large surface, must be used. This includes ceramics with both the microscopic one and the macroscopic porous surfaces. The later includes fibrous, sintering, thin plates, foamed/ballooned, mall pipes and other similar complex compounds. Ceramics are shaped to form air passages to reduce the flow resistance and may be in the form of lumps, blocks, honeycomb, plates, cloth, and like cotton wool. Ceramics can be more effective when the catalysts are charged with Pt, Pd, $ZnO_2$, chromium oxides, iron oxides, nickel oxides, cobalt oxides, manganese oxides and so on, which are developed by the chemical engineering arts or uses as catalysts in the catalytic converter of a car. Minerals which may be mixed with ceramics may also improve the effectiveness of the catalysts. Pt and like have effects of acceleration of burning, oxidation, and decomposition even at room temperature when they are charged in the low temperature zone (less than 500 degrees C.). However, ceramics have the same effect with Pt and like when the intake of converter is kept over 600 degrees C. and preferably around 700 degrees C. When air heats up to over 300 degrees C., the combustion is accelerated. recognizably. Even when rubber is burned, fumes disappeared. $ZrO_2$ and like have specially a good effect to decompose $NO_x$ and make it to thermal equilibrium concentration. Therefore, materials, which include $ZrO_2$, must be used not only in converter but also on fire room wall, as castable-cement, fire cement, etc. The converter makes flammables burn, $NO_x$ decomposes, acid pollutant changes into higher oxides and particles stay there by filtration effect. Soot particles burn in the $O_2$ at existing high temperature area. Neutralizing fixation happens in converter when base particles are assembled therein. The more oxygen atoms molecular of acid pollutant has (the higher oxide acid pollutant is), the more easily it is dissolved in $H_2O$ and the stronger as acid it becomes. Therefore, it improves the efficiency of the scrubber that acid pollutant is changed into higher oxide. Namely, converter increases depollution effect of condenser and the scrubber. The combination of flammables burning out and neutralizing fixation has a large effect in removing organic halogen compounds, too. Before entering converter, organic halogen compounds almost disappeared by neutralizing fixation and good combustion condition in fire room. When a small amount of organic halogen compounds decomposes thermally to give halogens and organic compounds in converter, halogens are neutralized and fixed and organic compounds are burned out. Both reaction products disappeared and the reverse reaction cannot occur. Therefore the converter is an extremely effective apparatus for the removal of organic halogen compounds. $NO_x$ reaches the equilibrium concentration depending on the temperature by the catalysts. The lower the temperature is, the lower the equilibrium concentration becomes and the longer time is needed to achieve the equilibrium. $NO_x$ concentration becomes low in shorter time, when its entrance temperature and its exit temperature are made high and low, respectively.

The combination of converter and the sufficient amount of the high temperature air, which includes $NO_x$ and is obtained by heat recycle, can be substituted for pure $O_2$ and the Pt basket described in Pharmacopoeia.

The water vapor condensation is described.

Water vapor, which originates from the moisture of waste, lowers $O_2$ concentration and prevents complete combustion. If the water vapor is discharged by the exhaust fan, the same volume of air cannot be absorbed. The water vapor condenser acts a pump, the capacity of which is the decreasing volume from gas to liquid. The absolute quantity of $O_2$ for the combustion can remain constant independently of the moisture of the waste, when water vapor is condensed or removed before discharge. The condenser is used not only to save the heat for drying wet waste to dryer, but also to help the combustion concerning $O_2$. $O_2$ changes into the same mole of $CO_2$ in combustion. Both the input air and exhaust have almost the room temperature. Therefore both air and exhaust have almost the same volume. This condition makes the design and establishment of air fans and exhaust fan easy. Since the thermal conductivity of $H_2O$ is 20 times that of the air, the ability of heat exchange using $H_2O$ is increased. When the $H_2O$ vapor is condensed, $H_2O$ catches harmful acid gases and acid pollutants and removes them, similar to the way that rain removes smog. However the condensed $H_2O$ is a strong acid, with a pH of about 2, which corrodes the materials of the machine. In order to avoid the corrosion, it must be neutralized by the alkaline scrubber solution. The scrubber solution, which is warmed by exhaust, warms waste and its drying is accelerated.

The integration of the scrubber to the machine can increase the efficiency even more. But it is better that the machine, especially for dry waste, have an independent scrubber because of the small effect of the integration.

The ability of absorption of acid gases in the condenser is increased because the condensed water is neutralized by the alkaline scrubber solution preferably to remove acid gases/pollutants in converter, the condenser and the scrubber are located directly after converter. Thus the ability of converter is increased so that organic halogen compounds are controlled effectively. Since condenser and the scrubber can act as wet type air cleaners, dust particles in exhaust are removed here. Basic particles such as fly ash are also caught here and utilized again in the scrubber.

Ash in the machine is now described.

When ash increases the flow resistance, an air intake fan especially for ash (ash air fan) is set, so that the shortage of hot air for ash is prevented. While embers are burning out, their flammable material content decreases and embers become more difficult to burn. Fresh hot air is made flow in the reverse direction of the motion of ash. Then, while embers are burning out, they can be exposed to fresher hot air. Thus embers can burn completely. At the same time the volatile pollutants are vaporized and blown back to the fire room and they are prevented to remain in ash. When ash stays long time in high temperature (more than 650 degrees C.), it becomes dense. The post treatment of dense ash is easy. If waste is in lumps/clusters or in the form of dumplings and it is exposed to insufficient air or is not maintained at high temperature until it burns out then volatile pollution such as dioxin remains in ash. In order to prevent forming of waste lumps, waste is cut and crushed to small size before the incineration. Cascade steps are made in fire room to maintain the embers in air long time and to expose them to air. A rotary kiln can be used in order to drop, turn over or tumble upside down waste/embers repeatedly, except the case of the waste which include no halogen or leaves little ash. Namely, waste and embers are kept hot, exposed to air, divested of cool place and exposed to fresh hot air until burn out, so that volatile matter does not remain in the ash.

The flows of air and waste are described.

The air inside the protective wall is inhaled by air inlet fans (air fans) and moves from the cool area to the hot area, namely outside of the scrubber, through the condenser and the converter, to the fire room. Air becomes almost as hot as the fire room wall temperature. The route followed by air is called the intake air duct. Exhaust is cooled in the converter, in the condenser (where $H_2O$ is condensed), out of utilizer and in the scrubber. The $O_2$ concentration is measured, and discharged to the atmosphere by exhaust fan. The route where exhaust flows is called the exhaust duct. The rate of introducing of waste and air and discharging of exhaust are regulated so that the $O_2$ concentration in the exhaust is kept above 10%. However $O_2$ concentration can be regulated to be lower than 10% in the cases where the $H_2O$ content of waste is very high or when the production of pollutants is low. $O_2$ cannot be measured if the waste characteristics remain constant. In this situation, the machine may be set or designed using calculated or empirical $O_2$ values. The exhaust fan must have larger capacity than air fans. This capacity difference combined with the pumping effect of condenser results the following effect. The valance air is inhaled from the waste storage tank and caries bad smell into the waste duct. This air helps waste dry and water vapor and volatile matter to be transported and becomes a part of combustion air in decomposer. Because exhaust side (scrubber side) has lower pressure than the side of atmosphere, air and waste, the leakage of exhaust and the condenser/scrubber solution through seal/gaskets or open windows/leaks are prevented. Dangerous area has lower pressure than the safety area. When a rotary kiln is used, seal means become necessary. But, the above-mentioned negative pressure structure makes the seal means easier. For example, short pipes or doughnuts are formed by 2–5 sheets of ceramic cloth such as glass or kaolin. The one side of them is attached to fixed body and in another side the rotating body. And they are let through and pressed by the loosely tensioned ceramic or glass thread/yarn/string. The pipes or the doughnuts are sewn with the thread to prevent coming loose and coated by grease to prevent the leakage of gas or water. Such simple sealing can work.

After the waste is cut to small, crushed and mixed with base, it is quantitatively fed into dryer. The amount of the basic substance must be more than the stoichiometric ratio (usually 1.3–2 times of that). NaOH or KOH is usually used as basic substance in the scrubber because they both are well dissolved in $H_2O$. Ash, which includes no pollutant, can be used as basic substance for the scrubber, as well. Some waste is in the form of sticky substance which melts before burning, produces bad smells when mixed with a basic substance. In addition, in some types of machines in which it is difficult to use ash as a basic substance. Such machines need base introducers. The introducers introduce all or part of basic substance in form of a powder into the machine. Such a powder prevents waste from sticking. The powder becomes fly ash easily.

Waste is supplied into the fire room through the dryer and the decomposer. The route, where waste moves through, is called the waste duct.

Waste is dried in the dryer by the heat from the scrubber solution, condensed $H_2O$ and the exhaust. However dry waste needs not to be dried (the dryer is not necessary). The waste obtains heat in the decomposer, decomposes thermally and burns partially. If waste includes components which have low volatile temperature and low flash point, flames can be formed and spread out not only in the decomposer but also in the dryer and explosive combustion can be caused repeatedly. In order to avoid this, the waste duct must have narrowed necks in the dryer, in the decomposer and/or the boundaries thereof.

Organic halogen compounds are neutralized and fixed in solid in the decomposer as well.

In fire room, a pilot light is initially turned on and remains on. The pilot lamp can be extinguished when the temperature is higher than auto-ignition point (air is hotter than 650 degrees C.) and the combustion heat of waste can maintain the fire room temperature. The pilot light is selected so that it has an igniter and it burns using air in fire room. Therefore air must be supplied around the pilot light to keep it on. Since the lamp needs only small amount of fuel, $O_2$ concentration is not lowered considerably by the pilot light and the waste is not blown away toward the exit, as it is the case with strong burner which is used in conventional incinerators.

$ZrO_2$, which is included in the refractory material of the fire room wall, makes the $NO_x$ concentration close to the heat equilibrium concentration at the fire room wall temperature. Part of reducing flame is mixed in fire room with the oxidizing flame in order to restrain the concentration of $NO_x$. $SO_x$ is neutralized and fixed in the solids in the fire room, so that basic substances must be incorporated in the fly ash there, as well. In the fire room, organic compounds are reduced so that organic halogen compounds are prevented from the reproduction. However, almost all halogen compounds become gas or liquid in the fire room. Therefore they are scarcely fixed in solid. Plural air suppliers in the chamber make the temperature of the center high. Enough $O_2$ must be supplied in order to combust the waste completely except at the hottest part in fire room.

Figure 8:
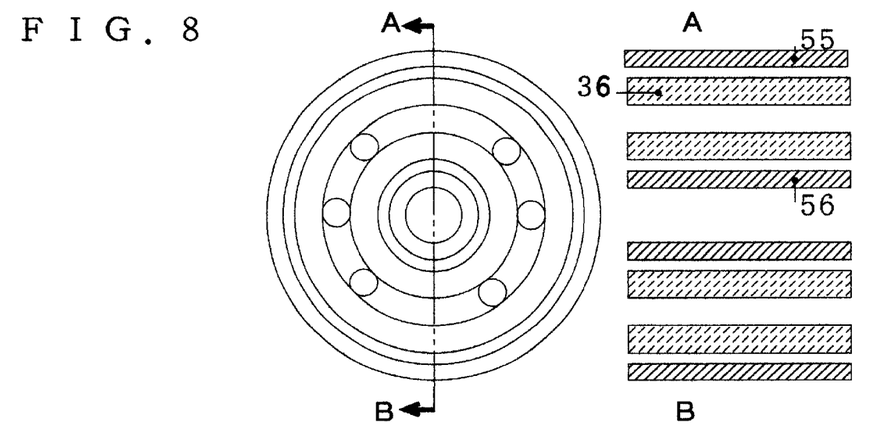
FIGS. 8–13 show the front views and right side sections of the converter, the ceramics of which are plates or cloth.
Figure 9:
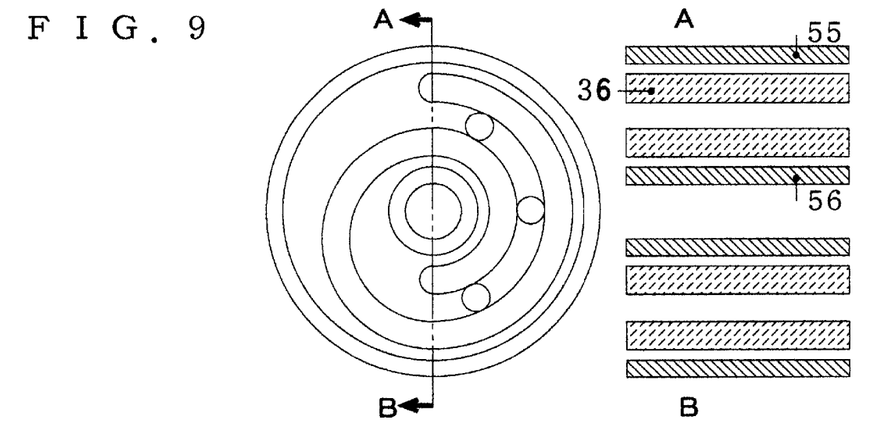
Figure 10:
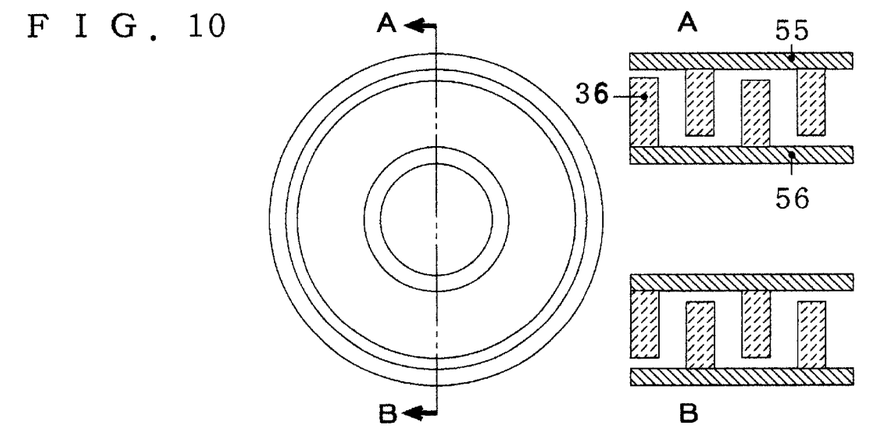
Figure 11:
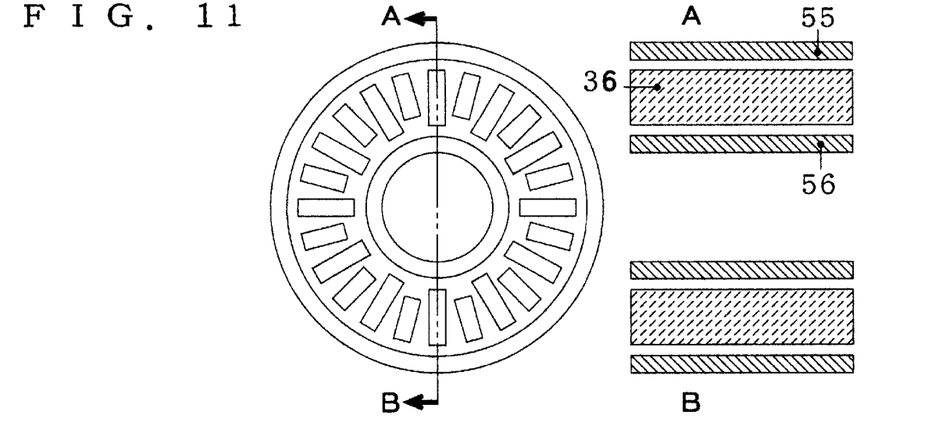
Figure 12:
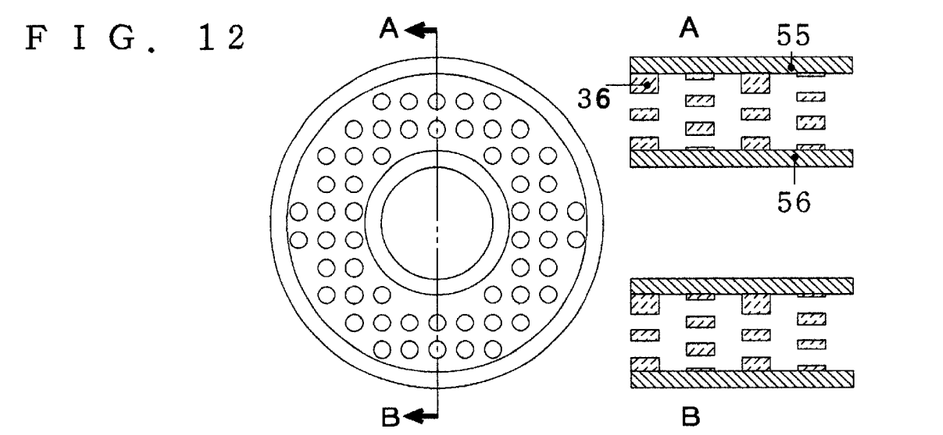
Figure 13:
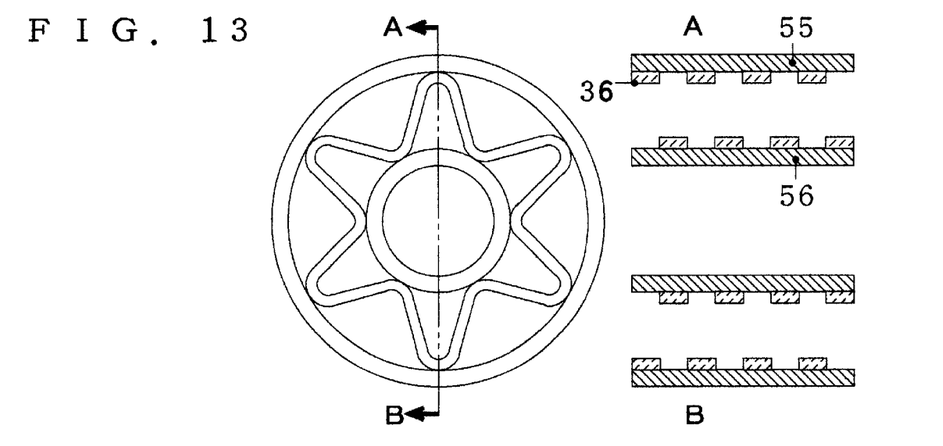

The temperature at the entrance side of converter must be kept high and the temperature of the exit side low. Since porous ceramics are good heat insulators, this temperature gradient is easily attained. The effect is advantageous to the reduction of the conductive product of the fire room. It must be kept in mind that an incomplete combustion in fire room increases the combustion in the converter, so that converter becomes hotter than the fire room. In such case the porosity of ceramics is damaged and the cooling of the exit side becomes incomplete. Before the exhaust flows into converter, the air must be mixed with the exhaust completely in the fire room, which must has sufficient burning space and the air velocity must be depressed (under 10 m/s converted to the room temperature). Not only artificial ceramics but also natural materials such as pumice stone and lava can be applied to the catalyst, the former being easier to be applied. While natural materials include some pollutants such as sulfur, they must be strongly fixed by the refractory cement so that they are not braised. The flow resistance through the ceramics should be minimized. Therefore recommended shapes for converter are plates (including wool plates) or cloth that are/is piled up or rolled with spacers, formed honeycomb like coaxial circles (FIG. 8, 9), nest structure (FIG. 10), radial (FIG. 11), sieves (FIG. 12), star like (FIG. 13), etc. The shapes of the ceramics in converter are selected by also considering dropping or removing of fly ash from the ceramics, homogeneously exhaust blowing to heat exchanging face and the collision of particles and usually selected among or combination of FIGS. 10, 11, 12. If the simplest shape is preferred, then blocks are selected. The basic substance has also a catalytic effect and is introduced into the converter as fly ash. In the converter, soot particles are trapped and they stay and eventually burned away. $NO_x$ is decomposed, acid pollutants are changed into higher oxides and neutralized and fixed in the solid basic material. Fly ash and even dilute organic compounds are burned away. The ceramic materials in the converter makes a secondary combusting burner unnecessary and this leads also to fuel saving. In conventional incinerators, a very big burner or big burners are used as a primary or as a secondary combusting burner.

In the condenser, $H_2O$ vapor in exhaust is cooled by air and waste, and condensed into liquid there. When air temperature is high enough (about higher than 700 degrees C.), steam, hot water, warm water, hot air or warm air can be obtained from the utilizer by cooling exhaust. For the conventional art, more air than stoichiometric requirement for complete combustion is provided, and the waste, which includes the much $H_2O$ or much ash component, are no more than the auxiliary fuel consumers. But for the invention, these components are good coolants having large heat capacity.

When the combustion heat of waste is large enough, the utilizer can be placed in wide range from the low temperature zone to the high temperature zone (around the exit of converter) and large amount of heat can be obtained. When only little amount of heat is obtainable, utilizer is placed about the outlet of the scrubber and warm water is obtained. When the air is not hot enough, excess heat utilization causes air temperature decrease, the lack of air heating and the decrease of pollution controllability of converter.

In the scrubber, the exhaust is cleaned by the solution. Various types of scrubbers can be used, such as a spray packed tower, a net plates tower, a helical flow tower and a biflex tower. A scrubber which is characterized with by a large flow resistance I undesirable. A part of the scrubber solution is introduced into the condenser so that efficiency of the heat recovery increases and the life span of the solution is lengthened. Since the condensed $H_2O$ is hotter than the scrubber solution, it can dry waste and heat up the air. The restraint of mixing with the scrubber solution helps the condensed $H_2O$ to remain hot. When wet waste is burned and all the solution are fed into the condenser, then the condensed $H_2O$ dilutes the solution and a lot of weak alkaline water must be drained. The solution should be let into condenser so that the condensed water is almost neutral. Then the drained water can effectively warm up the water of the utilizer. The scrubber circulating solution or combustion air can be warmed preliminary by the heat of condensed $H_2O$.

As described above, air is let into fire room after being heated outside of the scrubber, in the condenser and the fire room. Waste is moved inside of exhaust duct. Ash is moved in part of the air ducts in the reverse direction of airflow and is taken out. Micro-fuel and depollution are achieved in this structure when heat is sufficiently exchanged between the input and the output, the neutralizing fixation is affected and the converter is operational.

0.5 kg/hr auxiliary fuel was supplied to the pilot light of a test machine. Filtered remains of tofu scum, wasted tofu bean-curd and sewerage dregs cake was used as waste, each of which include 80–90% $H_2O$ and could burn at a rate of 100 kg/hr. The air temperature was 640 degrees C. before the waste introduction. It decreased to 635 degrees C. just after the introduction and then increased to 650 degrees C. and remained constant at that level. The temperatures of both exhaust and the scrubber solution were not higher than 5 degrees C. over room or ambient temperature. Neither smoke nor smell could be detected. A Kitagawa detector detected neither $NO_x$ nor $SO_x$. When an extinguishing fire hose composed of urethane and vulcanized rubber was incinerated, air temperature became higher than 700 degrees C. and exhaust was cooled by the utilizer. Neither smoke nor smell could be recognized. And neither $NO_x$ nor $SO_x$ were detected.

The invention can also be applied for the manufacturing processes which produced is ash, such the production as cement, and quick lime. Even when the waste does not have enough heat for combustion, saving fuel and preventing of pollutants are accomplished by using a small amount of auxiliary fuel or mixing coal powder or tire chips in waste. Since the temperature of exhaust is almost the room temperature, the machine can easily be made into a closed system.

BRIEF DESCRIPTION OF DRAWINGS

FIGS. 1–4 show arrangements wherein an air duct, a dryer, a decomposer, a fire room, a converter and a condenser are provided on a rotating body.

FIG. 5 shows an arrangement in which only part of air ducts and a fire room are made in a rotating body.

FIGS. 1–3 and 5 show arrangements wherein the rotating body lies horizontally.

FIG. 4 shows an arrangement with an inclined rotating body.

FIGS. 2 and 5 show arrangements with a constant diameter.

FIG. 1 shows an arrangement in which the diameter varies stepwise.

FIGS. 3 and 4 show arrangements wherein the diameter varies gradually.

FIG. 6 shows the machine for the waste that results in an output which does not contain large amounts of combusted residue.

FIG. 7 shows the machine for the waste that results in a large amount of combusted residual such as tire or FPR.

| Explanation of symbols | | | |
|---|---|---|---|
| 1 | waste storage tank | 2 | flue pipe |
| 3 | crusher | 4 | stirrer/collecting arm |
| 5 | waste introducer | 6a | tire holding plate |
| 6b | tire intake/residual outlet | 6c | tire stopper |
| 6d | residual storage | 7 | base substance storage tank |
| 8 | base substance introducer | 9 | dryer |
| 10 | waste transporter | 11 | heat reflector |
| 12 | decomposer | 13 | waste transporter |
| 14 | heat reflector | 15 | waste push-outer |
| 16 | air fan | 17 | ash air fan |
| 18 | heat transferring fin | 19 | air duct |
| 20 | ash transporter | 21 | secondary air port |
| 22 | primary air port | 23 | ash air port |
| 24 | base substance scatter | 25 | fire room |
| 26 | pilot light with igniter | 27 | ember transporter |
| 28 | cascade steps/embers dropper | 29 | waste scatter |
| 30 | smoke homogenizer | 31 | heat reflector |
| 32 | smoke bypass | | |
| 33 | main temperature sensor | 34 | temp. sensor |
| 34a | primary air temperature sensor | | |
| 34b | steam pipe temperature sensor | 35 | catalytic converter |
| 36 | ceramics/catalyst | 37 | ash out-letting flight |
| 38 | condenser | 39 | condenser fin |
| 40 | heat utilizing pipe | 41 | heat transferring pipe |
| 42 | alkaline scrubber | 43 | $O_2$ |
| 44 | exhaust fan | 45 | ash out-letter |
| 46 | ash storage | | |
| 47 | scrubber solution drain | | |
| 47a | circulating solution outlet | | |
| 47b | condensed water drain | | |

-continued

Explanation of symbols

| 48 | heat utilizing means (utilizer) | 49 | drain tank |
|----|----|----|----|
| 50 | scrubber solution tank | 51 | pump |
| 52 | protective wall | 53 | demister |
| 54 | outer wall (heat insulated) | 55 | middle wall |
| 56 | inner wall | 57 | rotator |
| 58 | rotating tire | 59 | pilot light support |
| 60 | gasket | 61 | external air duct |
| 62 | waste lifter | 63 | neutralizer valve |
| 64 | neutralizer inlet | 65 | utilizer inlet |
| M | motor | F | fan |
| P | pump | | |

BEST MODE OF CARRYING OUT THE INVENTION

The invention is capable of dealing with various types of waste and to be adopted to various types of incinerators devised for various forms or states of waste as a fire room. The mode of carrying out the invention adopting a rotary kiln is more effective to reduce the emission of pollutants. The mode of carrying out the invention without a rotary kiln is more easily matched with heat utilizing or the state of waste, needs less manufacturing cost per capacity and can be large equipment.

The embodiments of the invention are described using FIGS. 1–7.

Figure 1:
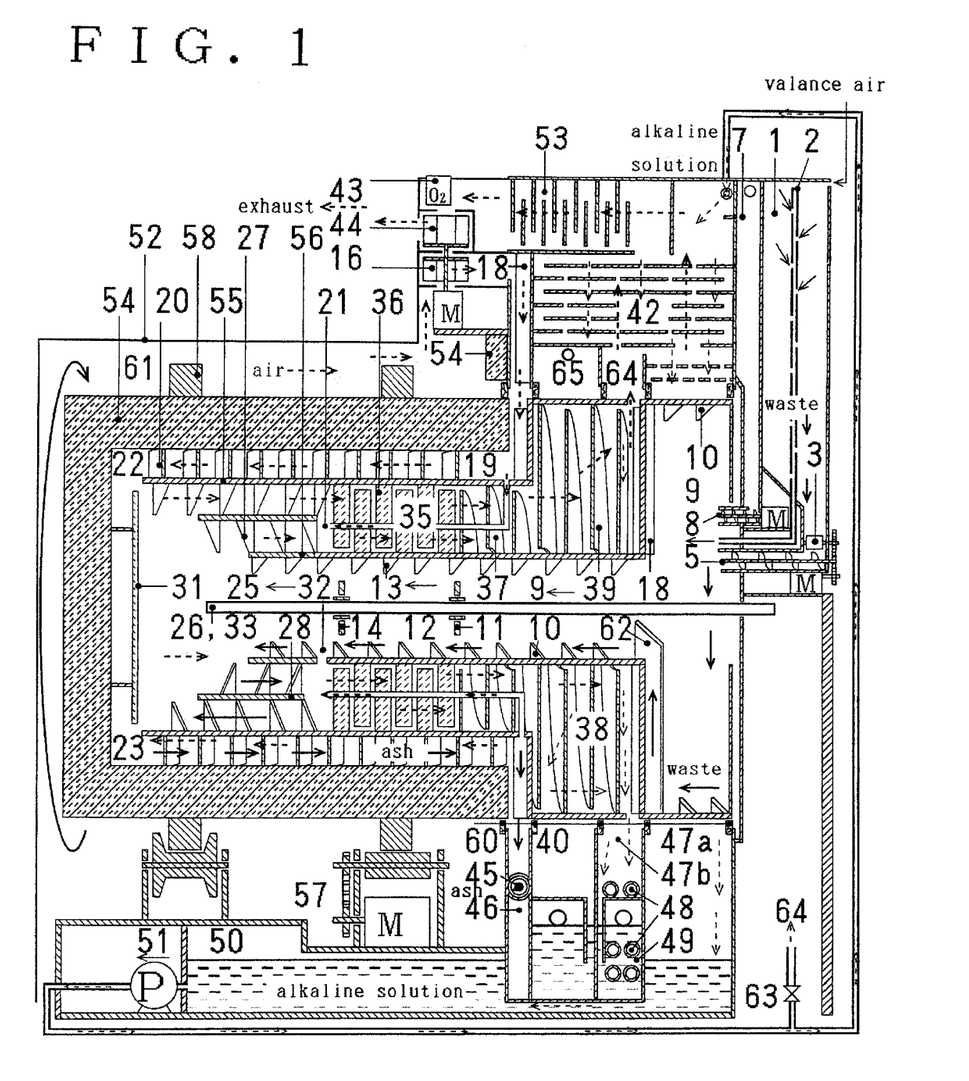
FIGS. 1–5 are vertical sections including rotating axis of desirable examples of the invention using a rotary kiln.

A machine of a first embodiment shown in FIG. 1 has air ducts (19), a dryer (9), a decomposer (12), a fire room (25), a converter (35), and a condenser (38). These elements are installed in a horizontally laid rotary kiln, the inner diameter of which is varied stepwise and with which a scrubber (42) is integrated. The machine itself acts the counter flow heat exchanger between incoming and outgoing. Waste is introduced quantitatively from waste storage tank (1) through a crusher (3) into a dryer by a waste introducer (5) that has a screw blade. Malodorous gases in waste tank are vented to the dryer through a flue pipe (2). A base substance is quantitatively introduced from base tank (7) into the dryer by the base introducer (8). Heat reflectors (11,14) in waste duct prevent backfire. A long pipe is inserted from waste introducing side along the axis of the kiln, and includes a pilot light (26) with an igniter and a temperature main sensor (thermocouple). Waste transporter (10,13) and ember transporter (27) are made of dropping flights, which have oblique plates. Ash transporter (20) is made of intermittent multiple spiral plates. A waste lifter (62) is made of a long dropping plate, which has an oblique plate and transports waste in the diameter-varying zone. The inner wall (56) and the middle wall (55) have spiral plates (37,39), which bail out the condensed water. Only part of the scrubber solution is introduced into condenser (38) and the scrubber circulating solution outlet (47a) is separated from the condensed water drain (47b) where the water in utilizer is pre-warmed. The warmed water flows outside of the large diameter part of condenser and is heated (65,40). Since the large area of condensation increases the efficiency of utilizer, this embodiment suited for waste that is easily cut small and has wide range of heat of combustion.

Figure 2:
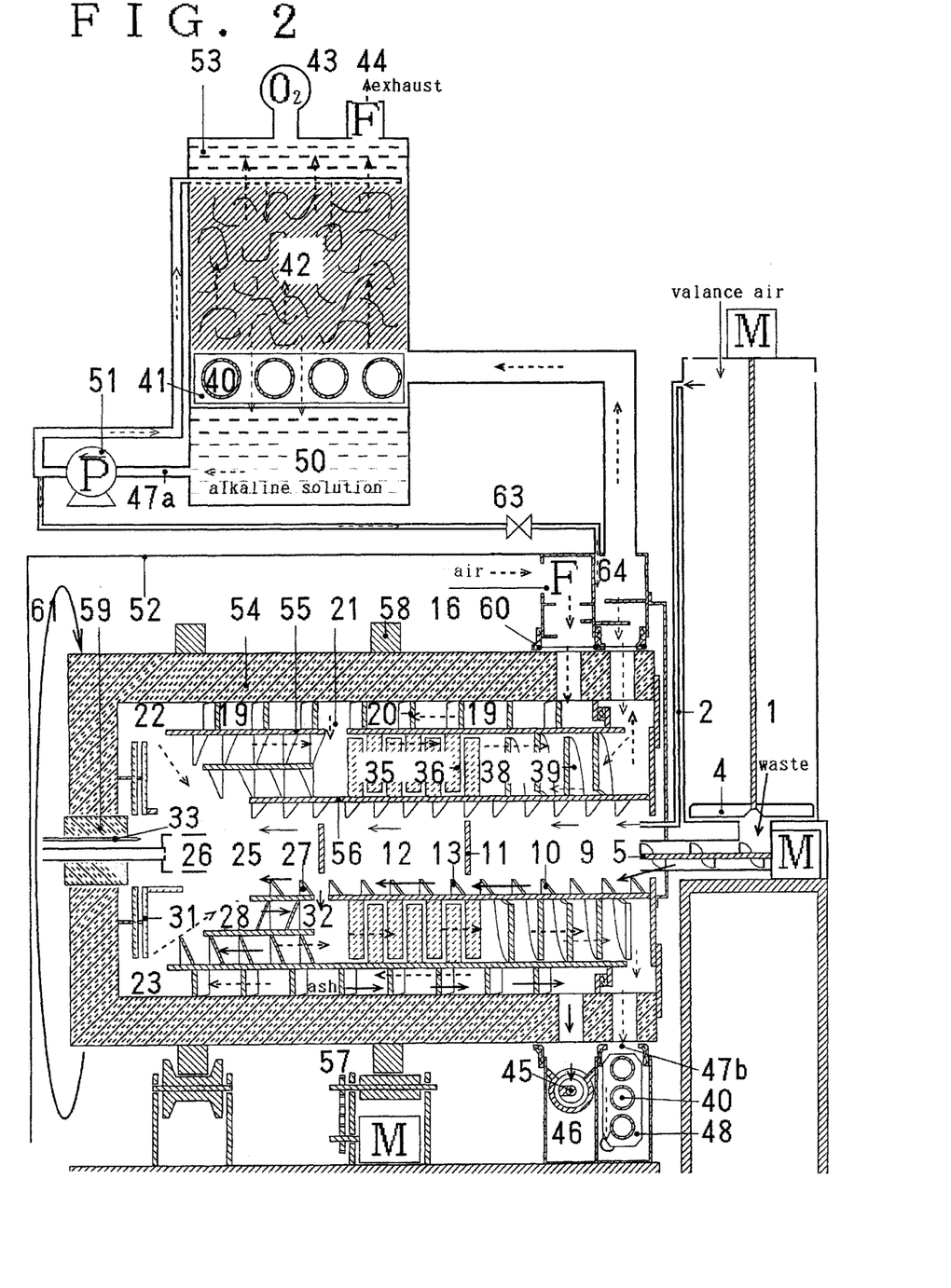

A machine of the embodiment shown in FIG. 2 has air ducts (19), a dryer (9), a decomposer (12), a fire room (25), a converter (35), and a condenser (38). These elements are installed in a horizontally laid rotary kiln and the diameter of which is constant. The machine itself acts the counter flow heat exchanger between the input and the output. A scrubber (42) is independent and neutralizing solution is regulated by the valve (63) and supplied to condenser. Waste is quantitatively introduced from the waste storage tank (1) to dryer by a waste introducer (5). Malodorous gases in the waste tank are vented to the dryer through a flue pipe (2). Heat reflectors (11) in waste duct prevent backfire. The pilot light supporter (59), which includes a pilot fire with an igniter (26) and a main temperature sensor (thermocouple) (33), is inserted along the rotating axis and allowed the axial swing but inhibited the rotation by the universal joint in order to connect with the fixed base. Waste transporter (10,13) and ember transporter (27) are made of dropping flights, which have oblique plates. Ash transporter (20) is made of intermitted multiple spiral plates. Each of the inner wall (56) and the middle wall (55) has a spiral (37,39), which bails out the condensed water. The rotating body is the simplest in FIG. 1–4. The embodiment is best suited for dry waste.

Figure 3:
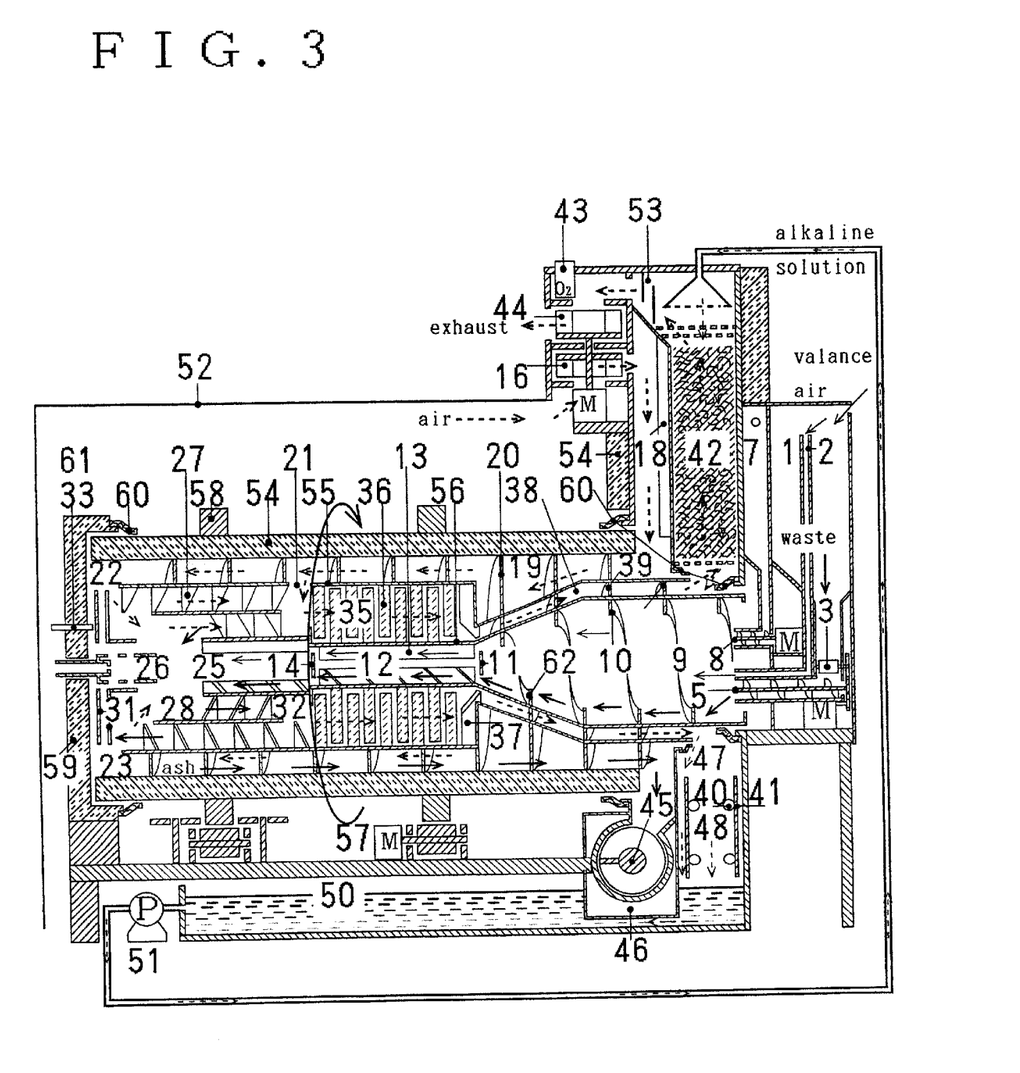

A machine of the embodiment shown in FIG. 3 has air ducts (19), a dryer (9), a decomposer (12), a fire room (25), a converter (35), and a condenser (38). These elements are installed in a horizontally laid rotary kiln, the diameter of which is varied gradually and with which a scrubber (42) is integrated. The machine itself acts the counter flow heat exchanger between the input and the output. Waste is quantitatively introduced from waste storage tank (1) through a crusher (3) into a dryer by a waste introducer (5), which has a screw blade. Malodorous gases in waste tank are vented to the dryer via a flue pipe (2). A base substance is quantitatively introduced from base tank (7) to dryer by base introducer (8). Heat reflectors (11,14) in waste duct prevent backfire. The pilot light supporter (59), which includes a pilot light with an igniter (26) and a main temperature sensor (thermocouple) (33), is fixed to the machine base. Waste transporter (13) and embers transporter (27) are made of dropping flights that have oblique plates. Ash transporter (20), waste transporter (10,62) and condenser fins (39) are made of single continual spiral. Long dropping plates (37), which have oblique plates, transport fly ash from converter to the condenser. Condensed water is bailed out by the diameter variation and the spiral plate (39). Since the condensation area is big, the embodiment is suited for slightly wet waste.

Figure 4:
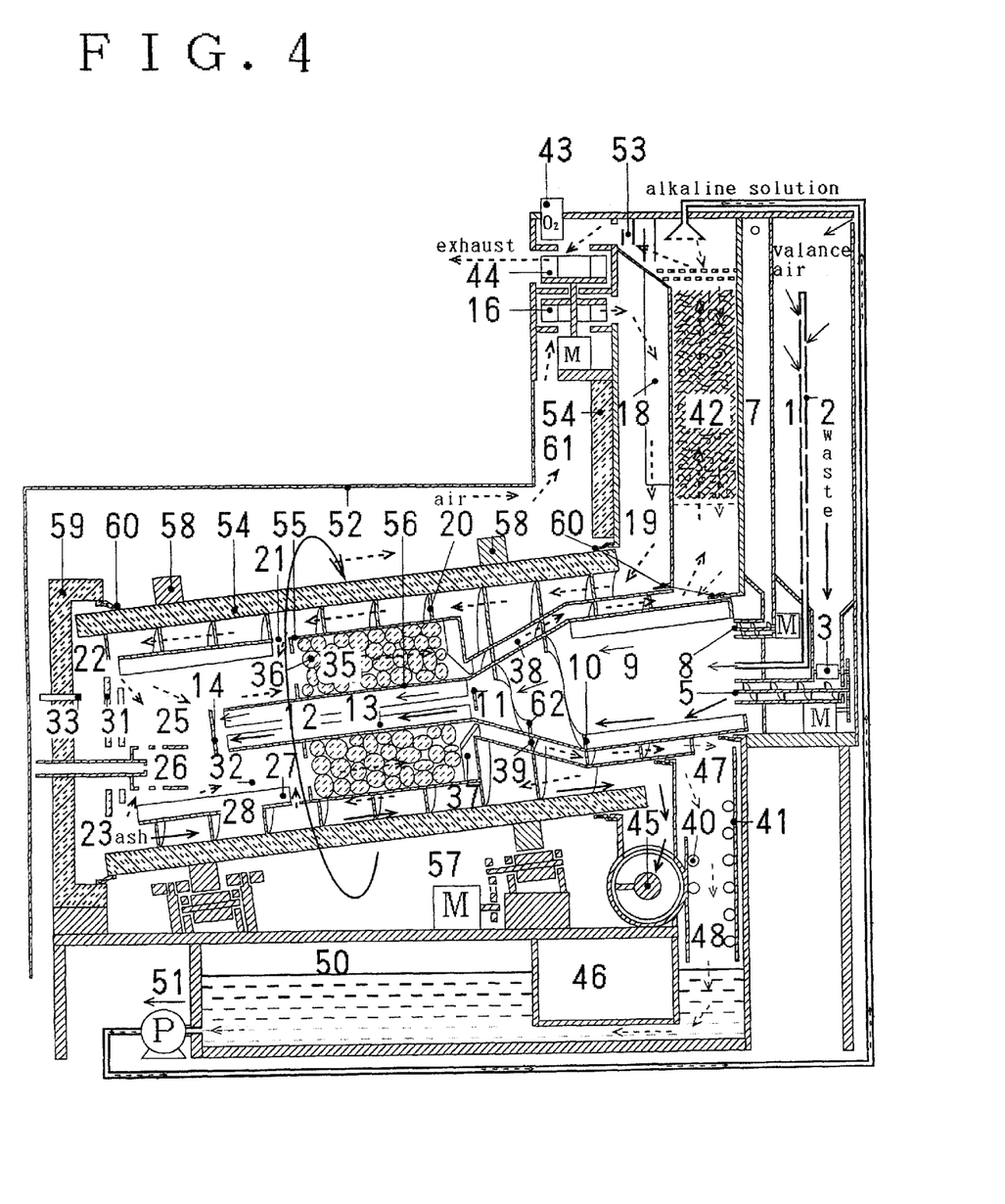

A machine of the embodiment shown in FIG. 4 has air ducts (19), a dryer (9), a decomposer (12), a fire room (25), a converter (35), and a condenser (38). These elements are installed in an inclined rotary kiln, the diameter of which is varied gradually and with which a scrubber (42) is integrated. The machine itself acts the counter flow heat exchanger between the input and output. Waste is quantitatively introduced into dryer from waste storage tank (1) via a crusher (3) by a waste introducer (5), which has a screw blade. Malodorous gases in the waste tank are vented to the dryer via a flue pipe (2). A basis substance is quantitatively introduced from base tank (7) to dryer by base introducer (8). Heat reflectors (11,14) in waste duct prevent backfire. A pilot light supporter (59), which includes a pilot light with an igniter (26) and a main temperature sensor (thermocouple) (33), is fixed to the machine base. Ceramic blocks (35) are fixed by the refractory cement including $ZnO_2$ powder. Waste transporter (10,13) and ember transporter (27) are made of dropping plates. Ash transporter (20), waste transporter (62) and condenser fins (39) are made of single continual spiral. Long dropping plates (37), which have oblique plates, transport fly ash from converter to the condenser. Condensed water is bailed out by the diameter variation and the spiral plate (39). Because hot condensed water makes a pool, waste can be easily dried. Since the condensation area is big, the mode is suited for wet waste.

Figure 5:
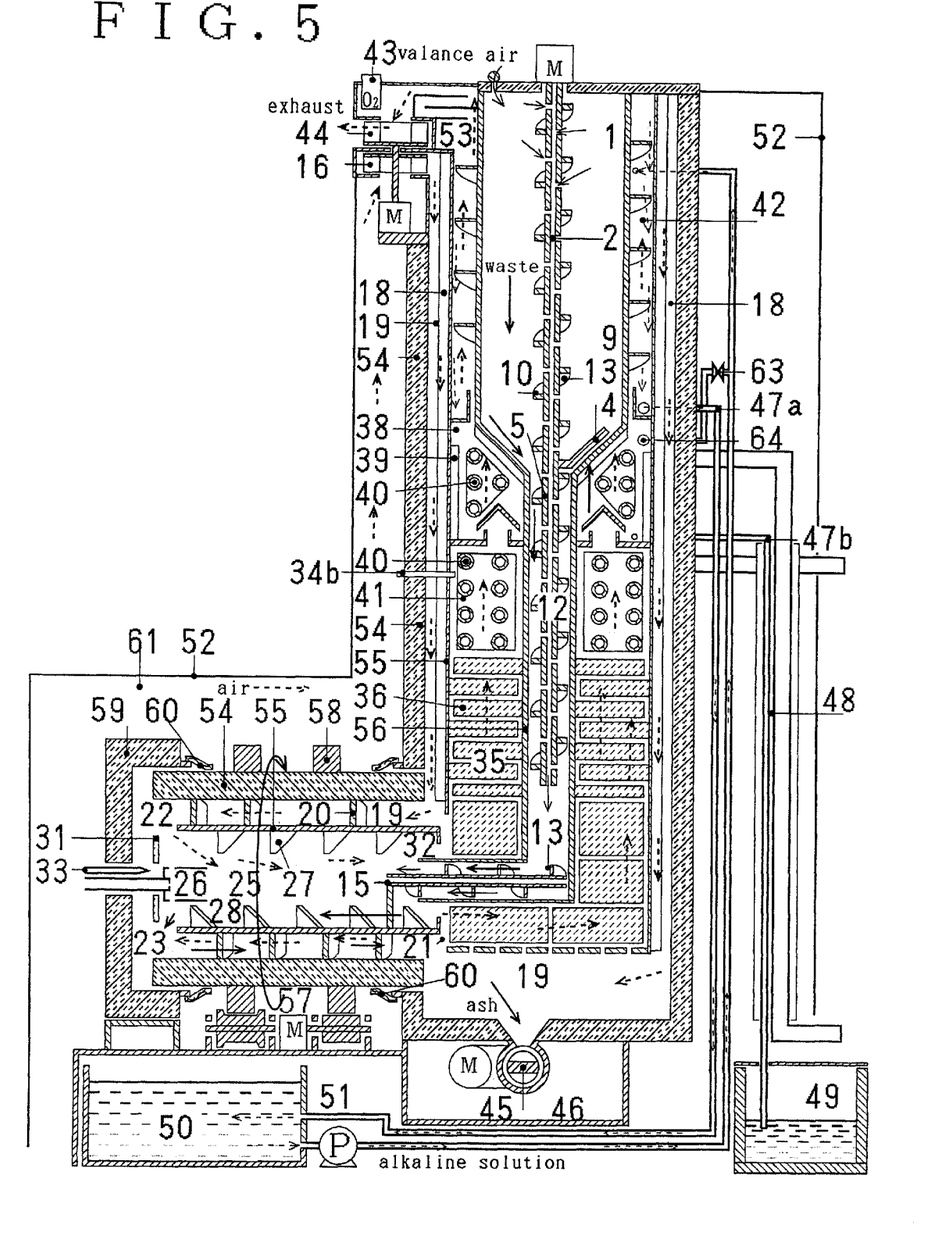

A machine of the mode shown in FIG. 5 has a fire room (25) and part of air ducts (19). These elements are installed in a horizontally laid rotary kiln, and the rest of air ducts (19), a dryer combined waste storage tank (1,9), a decomposer (12), a converter (35), a condenser (38), and a scrubber (42) are fixed to the machine base. All of them are so integrated that the machine itself acts the counter flow heat exchanger between the input and the output. After mixed with the basic substance and stirred by an arm (4) in dryer (1,9), waste is quantitatively introduced to fire room via decomposer by waste transporter (5). The transporter has a spiral (10) and a hollow pored shaft (2). The shaft vents water vapor and volatile matter such as gases in the tank or decomposer to the fire room. The hollow shaft prevents backfire. A pilot light supporter (59), which includes a pilot light with an igniter (26) and a main temperature sensor (thermocouple) (33), is fixed to the machine base. Ember transporter (27) is made of dropping flights that have oblique plates. Ash transporter (20) is made of intermittent multiple spiral plates. Fly ash considered the form of the ceramics is made radial in the lower part and nest structure in the upper part. The embodiment is suited for waste which has rather large combustion heat or which is rather hard to cut fine, because heat recovery becomes rather insufficiently.

Figure 6:
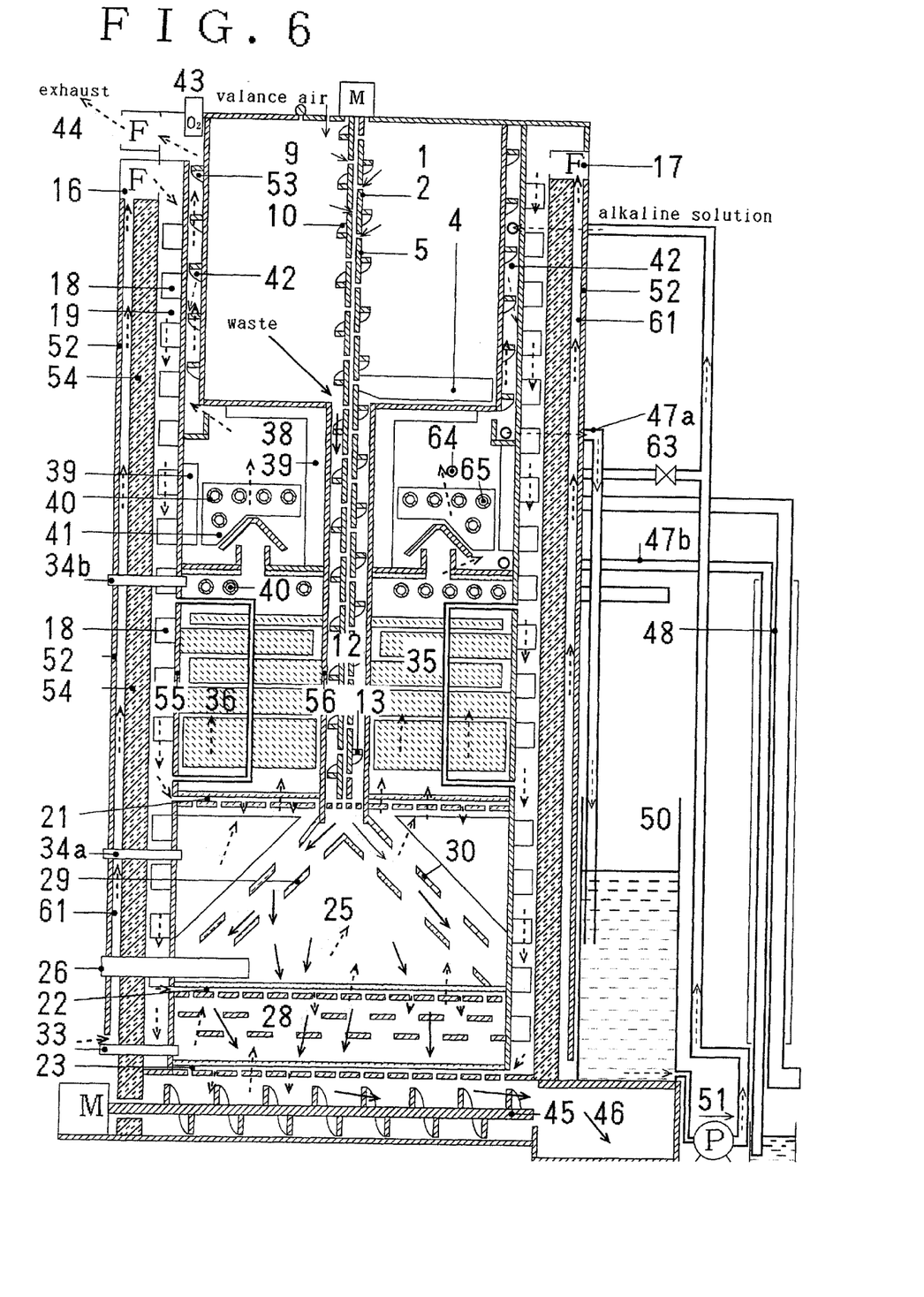
FIGS. 6 and 7 show the vertical section of desirable examples of the invention which do not use rotating body.

A machine of the embodiment shown in FIG. 6 has air ducts (19), a dryer and waste storage tank (1,9), a decomposer (12), a fire room (25), a converter (35), a heat utilizer, a condenser (38), and a scrubber (42). These elements are so integrated that a machine itself acts the counter flow heat exchanger between the input and the output. After being mixed with the basic substance and stirred by an arm (4) in dryer (1,9), the waste is quantitatively introduced to fire room via decomposer by waste transporter (5). The transporter has a spiral (10), a stirring arm (4), and a pored hollow shaft (2). The shaft vents water vapor and volatile matter such as gases in the dryer or decomposer to the fire room. The shaft prevents backfire. The stirring arm is so bent that it gathers the waste. The machine must have many waste introducers when its size is made large. Waste is scattered uniformly in fire room by a waste scatter (29). Fly ash considered the form of the ceramics is made radial in the lower part and nest structure in the upper part. Each of primary air port (22), secondary air port (21), and ash air port (23) is made of pipe array, on the under side of which air nozzles are so lined that air can be supplied homogeneously. This device increases the area of condensation so that the efficiency of heat utilization is improved. The embodiment is suited for such waste which has medium or large combustion heat, leaves little ash, produces little pollutants and is not easy or rather difficult to cut small.

Figure 7:
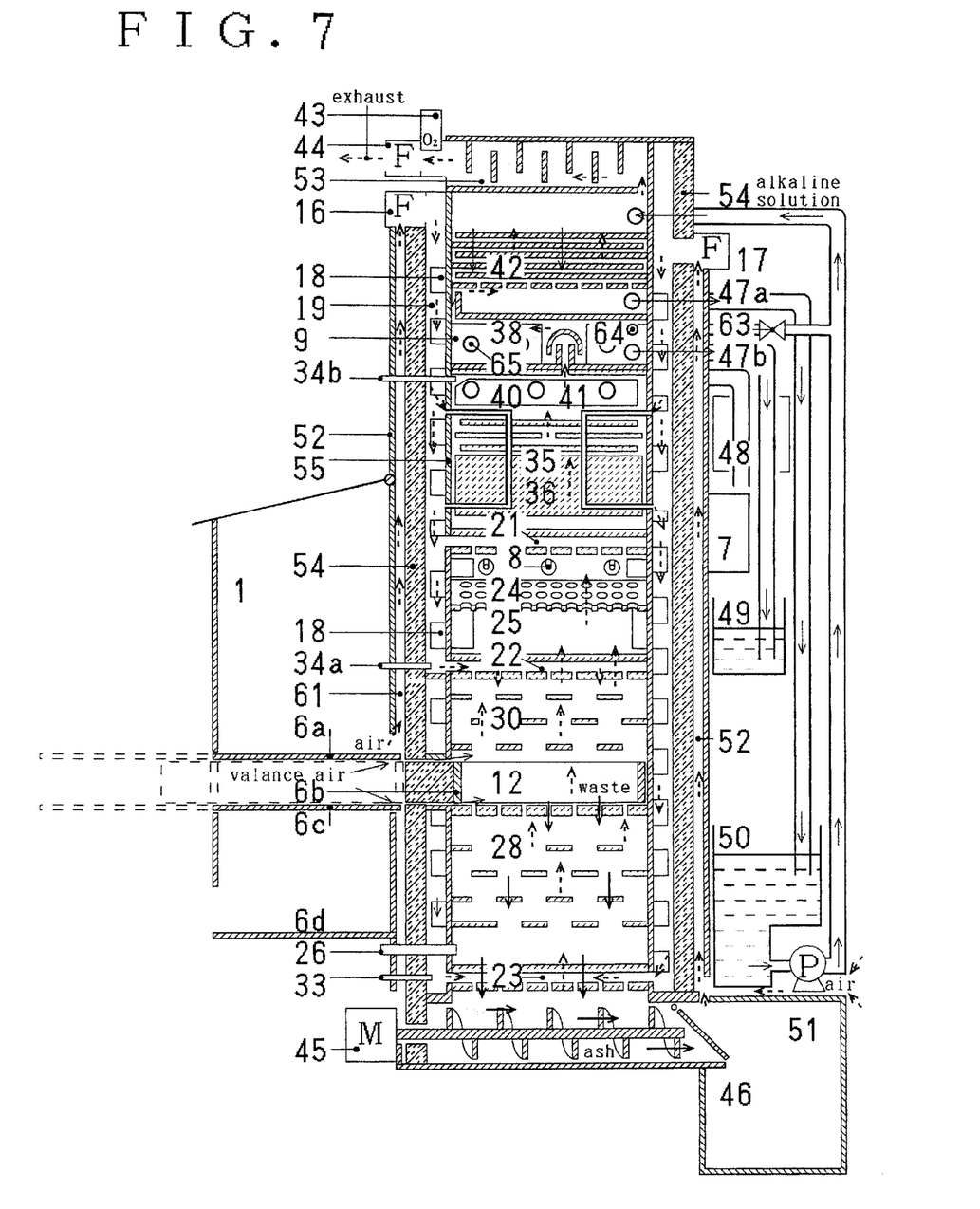

A machine of the embodiment shown in FIG. 7 is suited for such dry waste which has big heat of combustion and remains as large size of residual but with little ash. Waste such as tire is expensive to cut, because the cutter is very expensive. For this type of waste, both quantitative supply of waste and takeout of residuals is difficult. Therefore ash, residuals and waste are excluded from the object of heat exchange with air and exhaust. Air ducts, a decomposer (12), a fire room (25), a converter (35), a condenser (38), and a scrubber (42) are so integrated that a machine itself acts the counter flow heat exchanger between the air and the exhaust. A tire in-taker combined with a residual outlet (6b) is pulled out to the dashed line and a tire holding plate (6a) is also pulled out to the dashed lines. Then tire drops into tire in-taker from a tire (waste) storage tank (1). Tire holding plate is returned to its initial position immediately. Then tire in-taker is also returned and tire is set in the decomposer. The tire is quantitatively decomposed and burns slowly in decomposer as r regulated by fan (17) and the decomposed/vaporized gas burns in fire room. The tire burns out and the residuals are left in residual out-letter (6b). Tire stopper (6c) is pulled out to the dashed line. Residual out-letter is then pulled to the dashed line. The residuals drop into a residual storage (6d). All are returned to the initial position describing as the solid line. The tire must be introduced into decomposer after the primary air temperature (34a) becomes 600 degrees C. or higher by initial heating. In the decomposer, the tire is slowly decomposed, vaporized and combusted and ash and embers drop onto cascade steps (28) and large size of residuals are left in decomposer. Embers are completely combusted in cascade steps, where a pilot light exists and hot fresh air is supplied. The leakage of smoke from a machine is prevented by the difference of the capacity between air fans (16,17) and an exhaust fan (44) even when tire in-letter is pulled out and the inside of a machine is exposed. Such gases, as are produced when tire touches the hot in-letter, do not leak, because the air inside the protective wall (52) is inhaled to a machine by air fan (16). A machine that has several sets of tire introducer (6a, 6b, 6c and 6d) can stabilize the temperature in decomposer and has high efficiency of handling. Plural number of base suppliers (8) quantitatively supply the basic substance into fire room (25) from base storage tank (7). The basic substance is scattered homogeneously in fire room and made fry ash. Each of a primary air port (22), a secondary air port (21) and an ash air port (23) is made of pipes array, on the under the side of which air nozzles are so lined that air can be supplied homogeneously.

INDUSTRIAL APPLICABILITY

The invented machine needs very little amount of auxiliary fuel, emits only very low level of pollutants. It can be applied for various types of waste. It is applicable to such waste as rubber or plastics that have very large heat of combustion. It is applicable to the waste such as sewerage dregs cake that includes much water and is difficult to burn or ignite. It is also applicable to such waste as tire and FRP that results in large sized residuals. The invention is applicable to cement or quick lime production.

What is claimed is:

1. A waste incinerator comprising:
    a heat insulated body;
    a rotating housing formed within said heat insulated body, said rotating housing including a fire room receiving waste for burning, an air duct conducting combustion air to the fire room, an exhaust duct conducting exhaust from said fire room, said exhaust being produced by the burning of said waste, said exhaust duct being oriented to conduct said exhaust in a reverse direction with respect to said combustion air, said exhaust duct and said air duct forming a counter flow heat exchanger;
    a waste moving member arranged to move said waste to said combustion chamber for combustion;
    a catalytic converter disposed within said heat insulated body and receiving said exhaust from said exhaust duct to remove pollutants from the exhaust;
    a water vapor condenser disposed within said heat insulated body and receiving said exhaust from said catalytic converter, said water condenser being adapted to remove water and acids from exhaust; and
    a scrubber disposed within said heat insulated body and receiving said exhaust from said water condenser to remove particulate matter, said scrubber using a scrubber solution which is recirculated to said water vapor condenser to neutralize said acids.

2. The waste incinerator of claim 1 further comprising a waste storage tank holding waste before said waste is moved by said waste moving member to said fire room, another tank holding a basic substance; and an introducer that introduces said basic substance from said another tank to said storage tank for mixing with said waste to neutralize the same.

* * * * *